W. P. MARBLE.
VALVE HANDLE.
APPLICATION FILED JULY 31, 1908.

954,533.

Patented Apr. 12, 1910.

Witnesses.
C. H. Gannett
J. Murphy.

Inventor:
Walter P. Marble
by Jas. H. Churchill
atty.

UNITED STATES PATENT OFFICE.

WALTER P. MARBLE, OF CAMBRIDGE, MASSACHUSETTS.

VALVE-HANDLE.

954,533.  Specification of Letters Patent.  Patented Apr. 12, 1910.

Application filed July 31, 1908. Serial No. 446,282.

*To all whom it may concern:*

Be it known that I, WALTER P. MARBLE, a citizen of the United States, residing in Cambridge, county of Middlesex, and State of Massachusetts, have invented an Improvement in Valve-Handles, of which the following description, in connection with the accompanying drawings, is a specification, like letters on the drawings representing like parts.

This invention relates to a handle for valves and like devices, and has for its object to provide a simple, inexpensive and efficient handle, which is capable of being securely attached to its stem. To this end, the handle proper of wood or other non-metallic material is provided with a central bore or hole and with one or more sockets for the reception of locking projections of softer material than the handle proper, such as an alloy of soft metals, which projections form part of a hub of softer metal or alloy of metals, which is fitted into the hole in the handle proper and is of substantially the length of the said hole to form a long bearing, for a purpose as will be described. The soft metal envelops a sleeve of harder metal, which is angular in cross-section and is made tapering for the reception of the tapered end of the valve stem. These and other features of this invention will be pointed out in the claims at the end of this specification.

Figure 1:
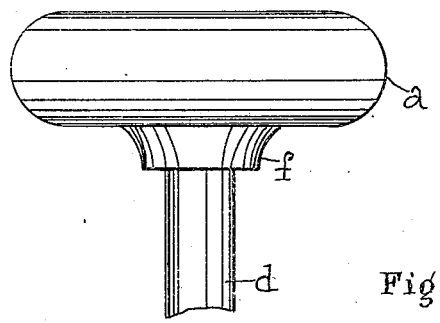
Figure 2:
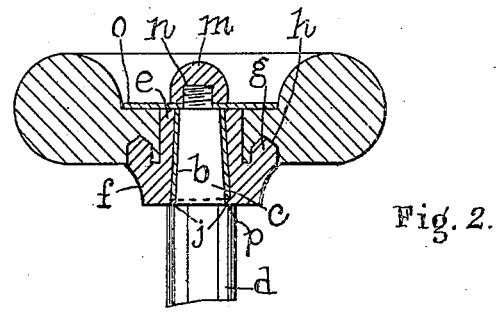
Figure 3:
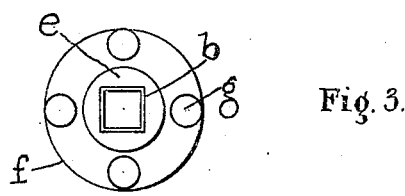
Figure 4:
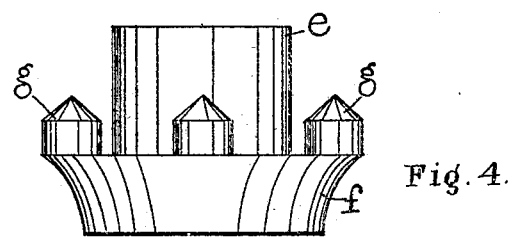

Figure 1 is an elevation of a portion of a valve stem provided with a handle embodying this invention. Fig. 2, a vertical central section of the handle shown in Fig. 1. Fig. 3, an inverted plan of the soft metal hub, and Fig. 4, an elevation on an enlarged scale of the soft metal hub shown in Fig. 2.

Referring to the drawings, $a$ represents the handle proper, of wood, or other suitable material and provided with a substantially central bore or hole extended through it, and in which is placed a sleeve $b$ of brass or other suitable metal.

The sleeve $b$ may and preferably will be made tapering and angular in cross-section to receive the tapering end portion $c$ of the valve stem $d$. The sleeve $b$ is secured to the handle $a$ by a hub $e$ of softer material than the handle, such as a soft metal or an alloy of soft metals, which hub fills the space between the sleeve $b$ and the walls of the opening in the handle and is of substantially the same length as the central bore or opening so as to obtain a long bearing for the valve stem and prevent rocking of the handle $a$ on the said valve stem. The hub $e$ has extended from one end of it a flange $f$ integral therewith and provided with a plurality of nubs or locking projections $g$, herein shown as four in number, (see Fig. 3), which enter holes or sockets $h$ in the underside of the handle $a$, and serve to lock the soft metal hub to the handle against rotary movement independent thereof. The metal sleeve $b$ projects beyond the under side of the handle $a$, and is enveloped at its end by a lip $j$ on the soft metal hub, which serves to prevent the sleeve $b$ being pulled out of the soft metal hub, when the valve stem is withdrawn or removed from the handle, especially if the tapered end of the stem should stick to the sleeve. The handle may be secured to the valve stem by a nut $m$ engaging the threaded end $n$ of the valve stem, said nut preferably engaging a metal washer $o$ and when set up forcing the metal sleeve $b$ down against a shoulder $p$ on the valve stem, thereby firmly securing the handle onto the stem against longitudinal movement thereon, while the locking projections $g$ secure the handle $a$ to the soft metal hub against rotary movement thereon.

In the manufacture of the handle, the handle proper $a$ is inverted and the sleeve $b$ is centered in the central bore thereof, after which the soft metal is poured into the space between the sleeve $b$ and the walls of the central bore, and by means of a suitable mold (not shown), but which is fitted or laid upon the inverted handle, the molten soft metal is flowed into the mold so as to fill the sockets $h$ and form the locking projections $g$, the flange $f$ and also the lip $j$.

I may prefer to use a metal washer $o$, which is separate from the soft metal, but I do not desire to limit my invention in this respect.

The handle herein shown is strong, efficient and can be produced at a minimum cost.

Claims.

1. In a handle of the character described, in combination, a handle proper provided with a substantially central bore of substantially uniform diameter and with a plurality of sockets in its under surface, a sleeve inserted into said bore and projecting beyond the under surface of the handle proper, and a soft metal hub filling the space between the said sleeve and the walls of said bore and provided with a flange overlapping the lower surface of the handle proper and from which locking projections extend into said sockets, substantially as described.

2. In a handle of the character described, in combination, a handle proper provided with a central bore of substantially uniform diameter extended through it and with a plurality of sockets in its under surface, a sleeve inserted into said bore and projecting beyond the under surface of the said handle, and a material hardened from a plastic state filling the space between said sleeve and the walls of the central bore and filling said sockets and enveloping the projecting end of the said sleeve, substantially as described.

3. In a handle of the character described, in combination, a handle proper provided with a bore or opening of substantially uniform diameter extended through it and having a socket in its under surface, a sleeve inserted into said bore and projecting beyond the under surface of the handle, and a soft metal hub surrounding the said sleeve within and without said bore and provided with a flange having a projection extended into said socket, substantially as described.

4. In a handle of the character described, in combination, a handle proper provided with a bore or opening extended through it, a sleeve inserted into said bore for substantially its length and projecting beyond one surface of the handle, and a material hardened from a plastic state filling the space between the said sleeve and the walls of said bore and overlapping the lower edge of the projecting end of the sleeve, substantially as described.

5. In a handle of the character described, in combination, a handle proper provided with a bore or opening extended through it, a sleeve inserted into said bore for substantially the length thereof and projecting beyond one surface of the handle, and a material hardened from a plastic state filling the space between the walls of the bore and said sleeve and overlapping the lower edge of the end of the portion projecting beyond the handle, substantially as described.

In testimony whereof, I have signed my name to this specification in the presence of two subscribing witnesses.

WALTER P. MARBLE.

Witnesses:
JAS. H. CHURCHILL,
J. MURPHY.